United States Patent [19]
Howard

[11] Patent Number: 5,959,258
[45] Date of Patent: Sep. 28, 1999

[54] MULTIPLE HOPPER WEIGHING AND TRANSFER SYSTEM

[75] Inventor: W. Stamps Howard, Lilburn, Ga.

[73] Assignee: Kliklok Corporation, Decatur, Ga.

[21] Appl. No.: 09/009,960

[22] Filed: Jan. 21, 1998

Related U.S. Application Data

[63] Continuation of application No. 08/617,511, Mar. 15, 1996, Pat. No. 5,736,683.

[51] Int. Cl.$^6$ .......................... G01G 13/00; G01G 13/02; B65G 47/04
[52] U.S. Cl. ................... 177/25.18; 177/103; 177/104; 177/119; 198/532
[58] Field of Search ................... 177/25.18, 103, 177/104, 105, 107, 109, 110, 111, 112, 113, 126, 129; 222/185.1, 556; 198/532

[56] References Cited

U.S. PATENT DOCUMENTS

| | | | |
|---|---|---|---|
| 3,916,949 | 11/1975 | Armstrong | 177/25.18 |
| 4,413,771 | 11/1983 | Henry et al. | 177/25.18 |
| 4,462,520 | 7/1984 | Strehlow | 198/525 |
| 4,478,300 | 10/1984 | Mikami | 177/25.18 |
| 4,499,962 | 2/1985 | Izumi | 177/25.18 |
| 4,527,647 | 7/1985 | Ueda | 177/25.18 |
| 4,538,693 | 9/1985 | Klopfenstein et al. | 177/25.18 |
| 4,549,619 | 10/1985 | Fujiwara | 177/25.18 |
| 4,614,243 | 9/1986 | Ikeda | 177/25.18 |
| 4,660,661 | 4/1987 | Yamano | 177/25.18 |
| 4,683,966 | 8/1987 | Nakagawa et al. | 177/25.18 |
| 4,705,125 | 11/1987 | Yamada et al. | 177/25.18 |
| 4,721,072 | 1/1988 | Holterman et al. | 177/25.18 |
| 4,792,031 | 12/1988 | Warner et al. | 177/25.18 |
| 4,844,190 | 7/1989 | Mikami et al. | 177/25.18 |
| 4,848,534 | 7/1989 | Sandwall | 177/25.18 |
| 4,887,679 | 12/1989 | Bacon et al. | 177/25.18 |
| 4,947,946 | 8/1990 | Konishi et al. | 177/25.18 |
| 5,022,348 | 6/1991 | Bruecker et al. | 177/25.18 |
| 5,048,623 | 9/1991 | Toyoda | 177/25.18 |
| 5,258,580 | 11/1993 | Bergholt | 177/25.18 |
| 5,340,269 | 8/1994 | Caridis et al. | 177/25.18 |
| 5,379,923 | 1/1995 | Sagastegui et al. | 177/25.18 |

FOREIGN PATENT DOCUMENTS

| | | |
|---|---|---|
| 03-282221 | 12/1991 | Japan . |
| 04-60423 | 2/1992 | Japan . |

OTHER PUBLICATIONS

WO 94/13536 (Bleicher), Jun. 1994.

*Primary Examiner*—Randy W. Gibson
*Attorney, Agent, or Firm*—King and Schickli

[57] ABSTRACT

A multiple hopper system for improved forming of solid, flowing product into sequential batches or charges, transferring the batches between the hoppers, combination weighing/selection and discharging to a packaging machine is provided. A computer senses the batch weight and assigns the weight in sequence first to the transfer hopper, and then to the holding hopper. Both the transfer and holding hoppers participate in each computerized weighing/selection cycle. The forming hopper includes a shell and double-acting clam shell doors; the upper curved portion of each door extending into the hopper when the doors are open, thereby intercepting any late product in flight and initiating formation of the next batch. The transfer and holding hoppers also incorporate pairs of clam shell type doors. A curved transition chute is positioned below the holding hopper. The holding hopper doors slope at an angle in the direction along the closing lips of the door. The associated method, is characterized by forming and weighing the product in the first in-series hopper and then discharging the batch in sequence to the transfer and holding hoppers. These steps are repeated in succession, and checking of all hoppers by the computer is provided to generate an extended multiple shift mode of operation. In addition, there is a step of intercepting the product within the forming hopper to initiate forming of the next batch for further extension.

19 Claims, 7 Drawing Sheets

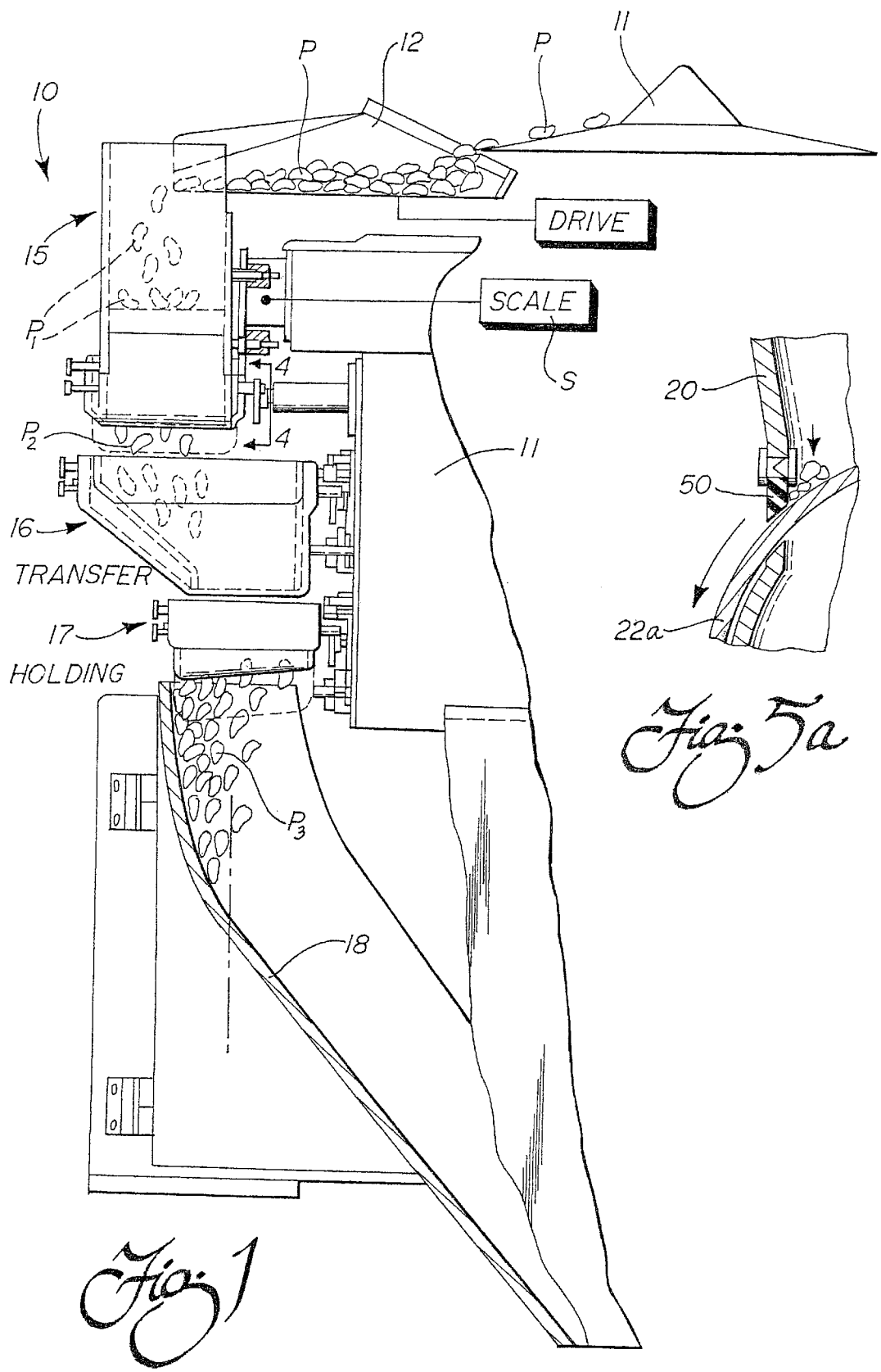

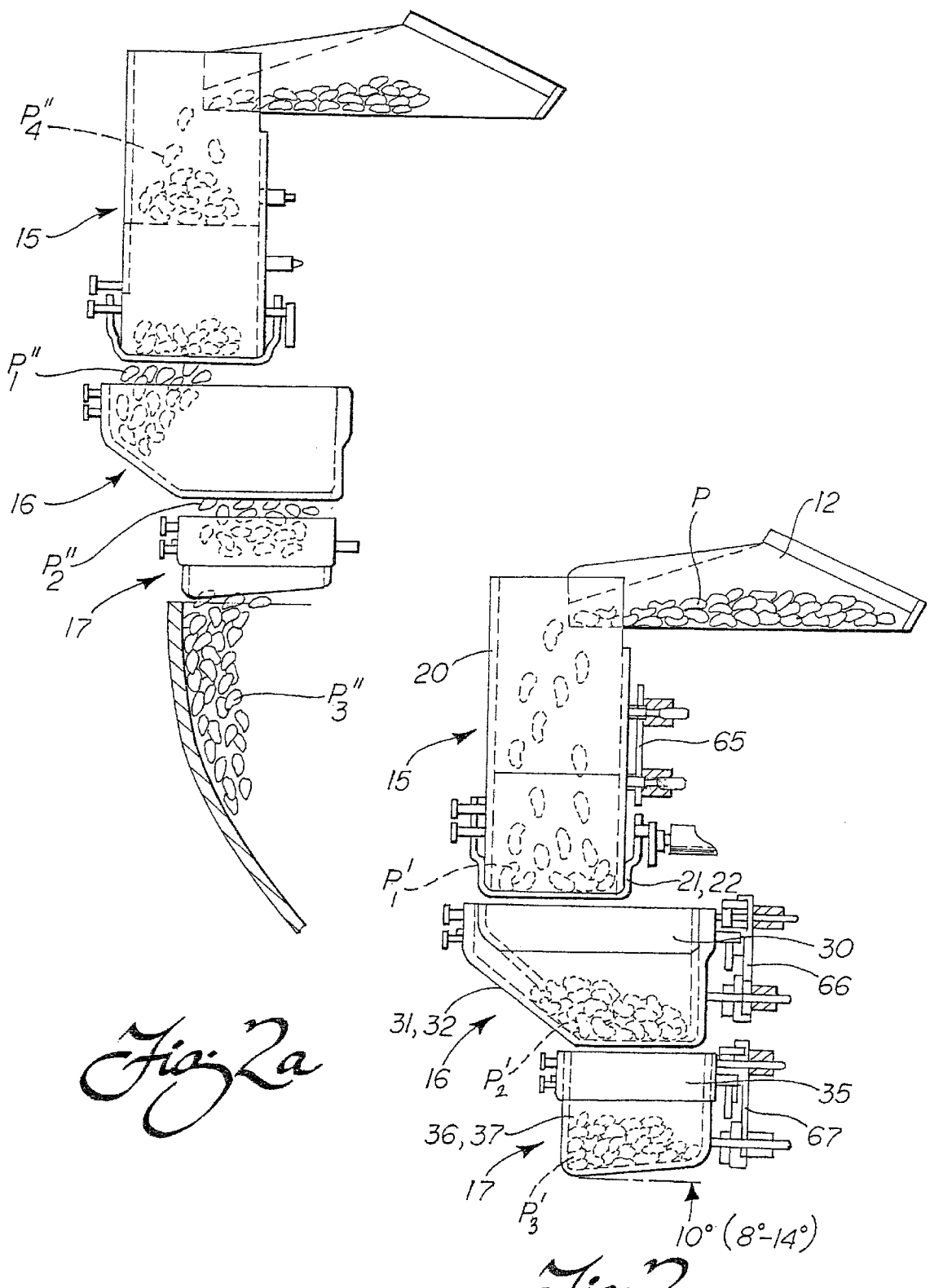

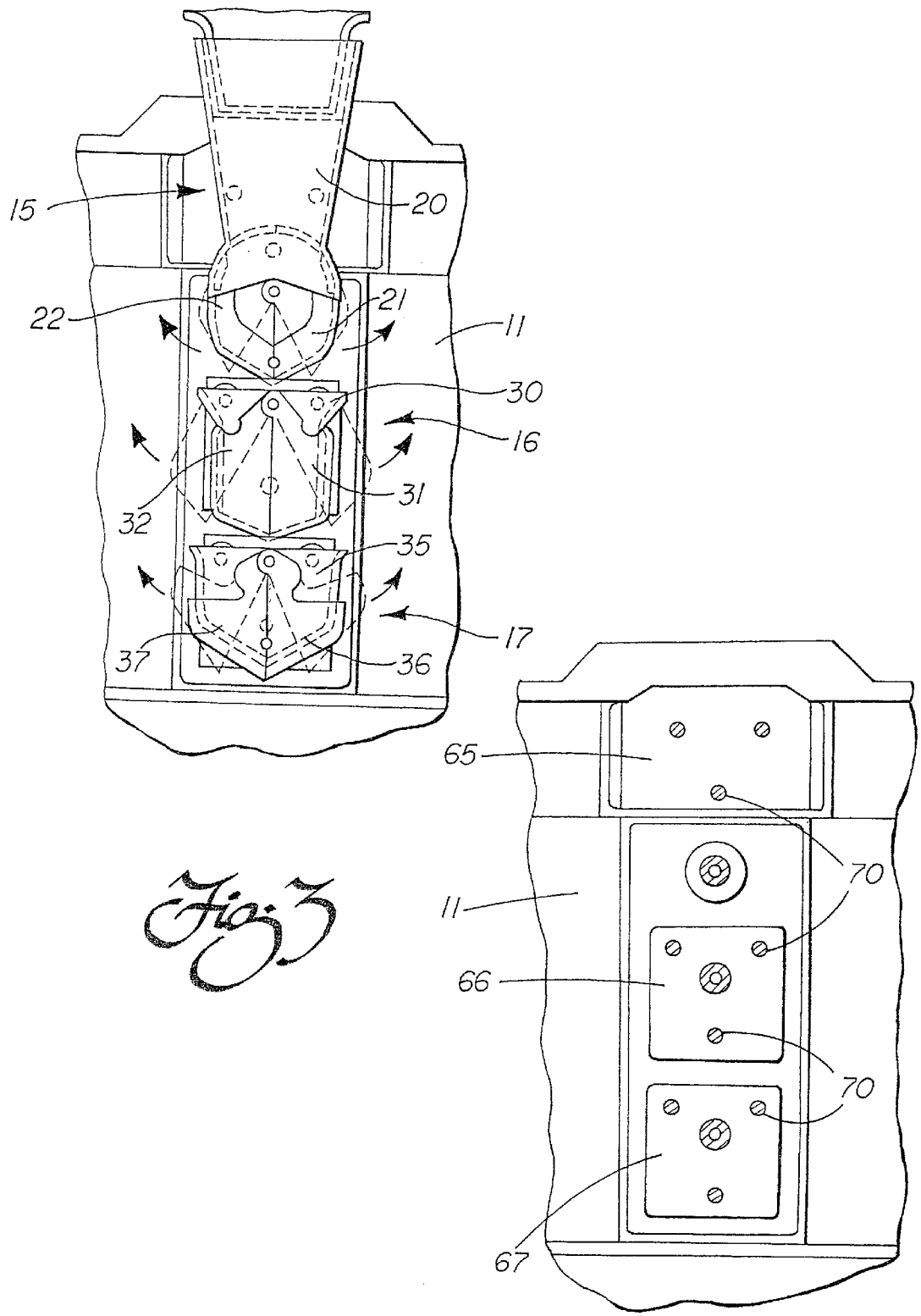

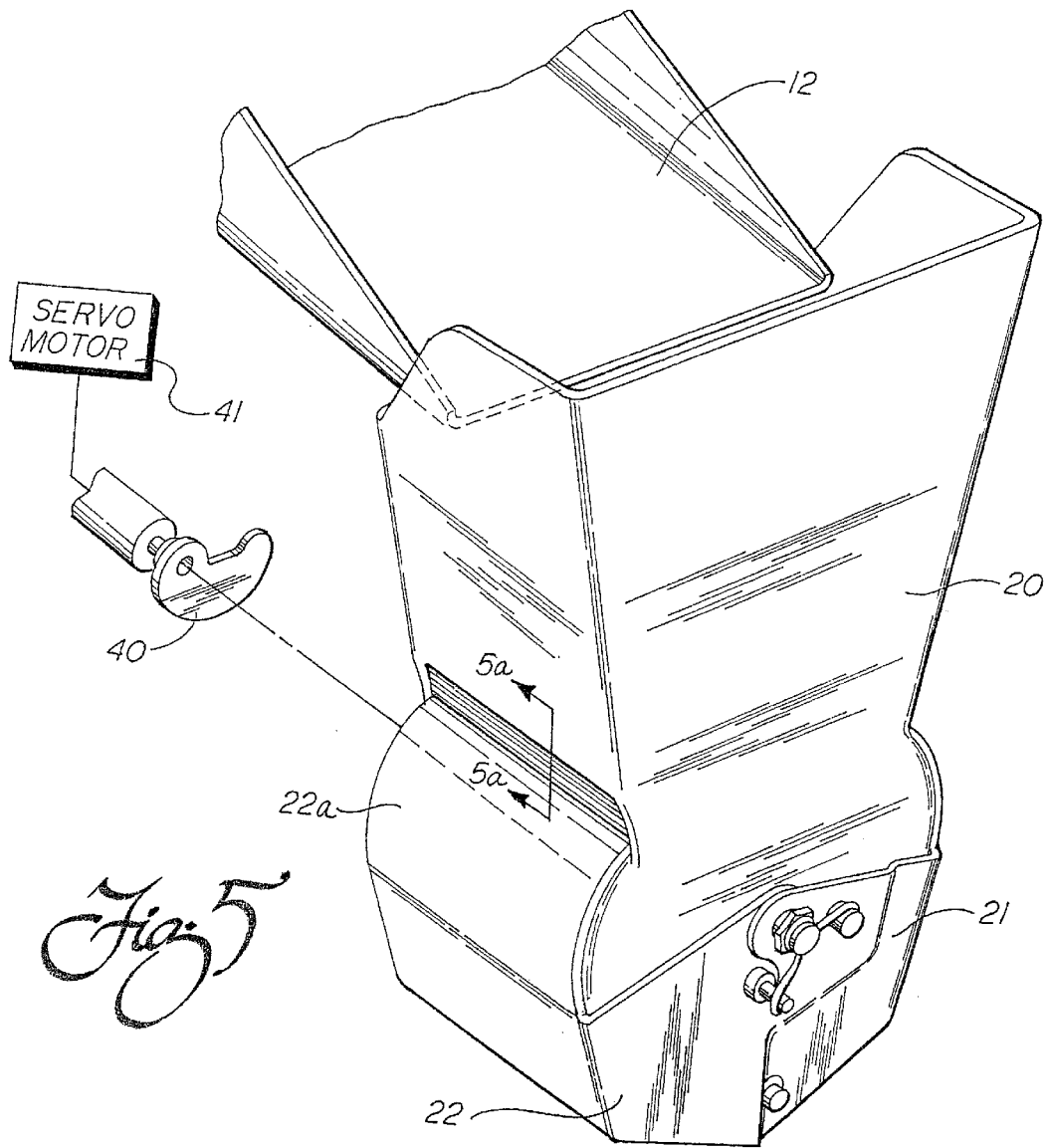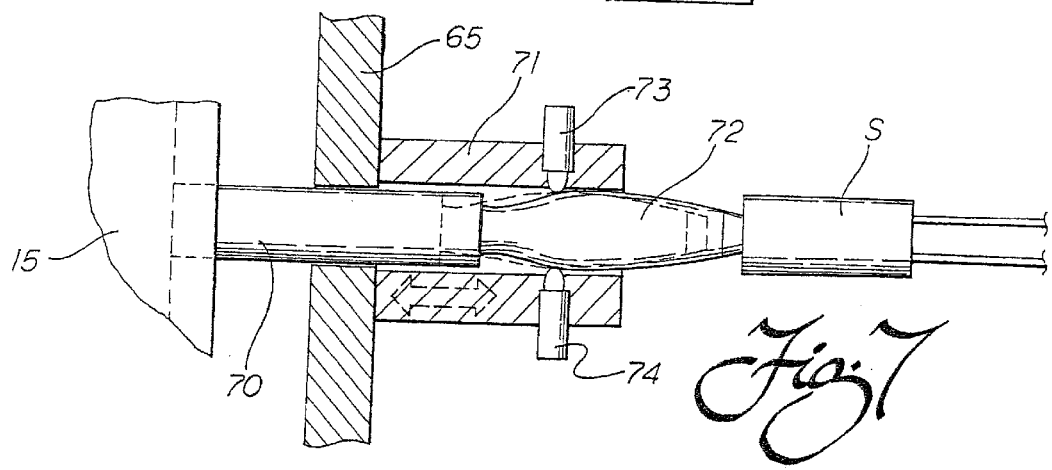

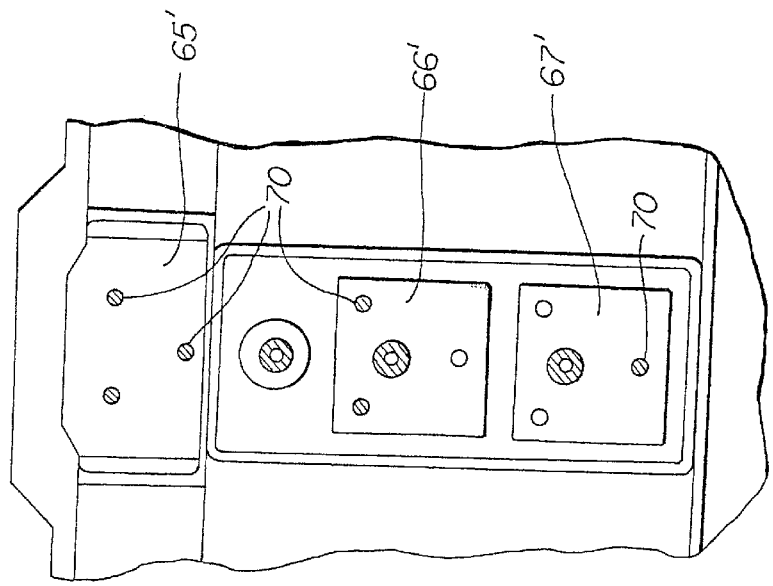
Fig. 6a
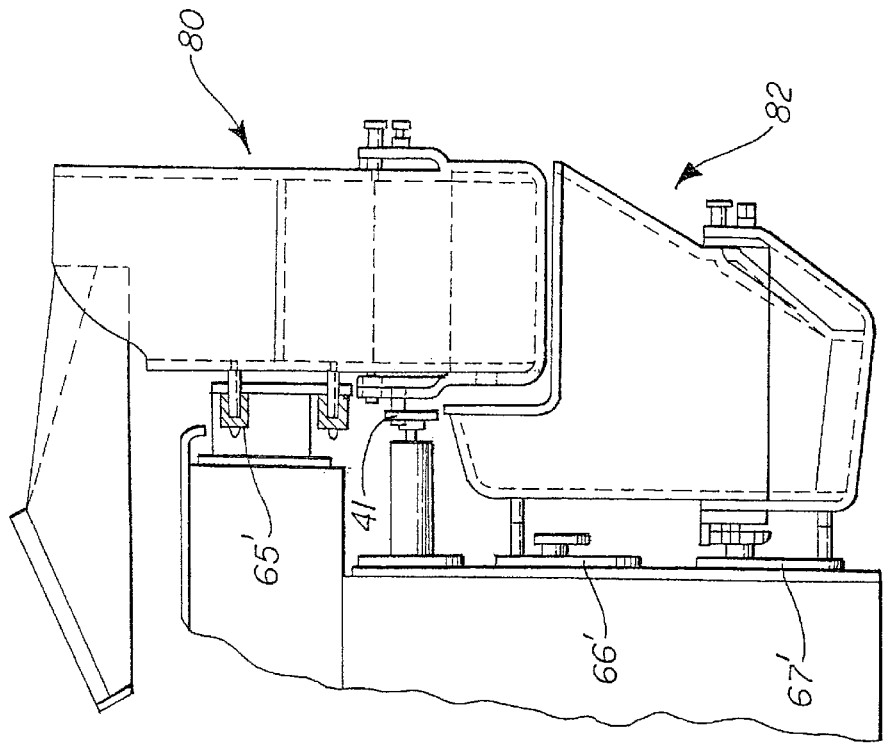
Fig. 6 ALTERNATE EMBODIMENT

MULTIPLE HOPPER WEIGHING AND TRANSFER SYSTEM

This is a continuation of U.S patent application Ser. No. 08/617,511, filed Mar. 15, 1996, entitled "Multiple Hopper Weighing and Transfer System" now U.S. Pat. No. 5,736,683.

TECHNICAL FIELD

The present invention relates to packaging machines and methods for solid, substantially free flowing product batches or charges, and more particularly, to a computerized weighing system incorporating a plurality of in-series hoppers for transferring the weighed batches in an efficient manner into the packaging machine.

BACKGROUND OF THE INVENTION

Over the past several decades, many advances have been made in improving the efficiency of weighing of batches of products for filling packages, such as pillow-type packages on a form, fill and seal packaging machine. A considerable improvement has been made in the technology of computerized combination weighing, that is where multiple product batches or charges are sampled and combined to make one product charge. These advances have not only provided an increase in speed of the overall packaging system, but have proven very successful in reducing product give away. A leading approach in computerized weighing is set forth in the computer circuit described and claimed in U.S. Pat. No. 4,418,771 entitled "Method and Apparatus for Combination Weighing" and 4,538,692 entitled "Method and Apparatus for Combination Weighing With Multiple Storage Cups for Each Scale Hopper", owned by the present assignee.

While there have been several attempts to improve the operation of the control circuit of the computerized weighing machines, little attention has been given to improving the handling of the product in the hoppers that form and weigh the batches. In terms of efficiency, the best arrangement has remained substantially unchanged since the time of the original machines and methods set forth in the '771 and the '692 patents. Specifically, in the past, the typical arrangement includes a scale hopper positioned to receive the stream of flowing product directly from a vibrating feed conveyor, and then once weight is made the batch is transferred to one or more holding hoppers or cups. In order to make certain that late, in flight product is not introduced into the scale hopper, a lip gate is provided at the end of the vibrating feed conveyor in these prior art systems. Some effort has been made to introduce a third hopper into the system, but with limited success. One such attempt is characterized by a pool hopper positioned above the weighing hopper to receive the flow of product from the feed conveyor. Since the weight of the product in the pool hopper is unknown, this hopper cannot participate in any manner in the combination weighing and selection process.

Furthermore, improving the efficiency of operation of the hopper itself and simplifying its structure has not attracted significant attention in the field. An example of this is that lip gates are still used in most arrangements to accurately cut-off flow into the batch forming/weighing hopper. Other inventors have resorted to using the pool hopper above the forming/weighing hopper in an attempt to alleviate the late, in flight product problem. Also, some inventors have been led to the use of a separate shutter positioned between the lip of the feed conveyor and the first in line hopper to catch the late product in flight; however, such an arrangement requires substantial additional mechanical components and operating mechanism which makes it an expensive alternative. Similarly, the operating mechanism for opening and closing of the gates of the hoppers have continued to be complicated and characterized by a large number of component parts, primarily linkages and springs. Still, no truly efficient approach to rapidly open and close the gates for efficient transfer of the formed batches of products has heretofore been found. Furthermore, these prior art operating mechanisms are not only more expensive to manufacture, but make clean up of the weighing machine much more difficult.

Besides the improvements in the control circuitry, some improvements have been made in other sections of the packaging machines, such as set forth in U.S. Provisional Pat. Application Ser. No. 60/000,750, filed Jun. 30, 1995 and entitled "Packaging System With Improved Transitional Product Flow and Adaptive Control". Furthermore, substantial advances in continuous feed of the packaging film, the actual forming of the packages has likewise reached a very advanced state, such as provided in U.S. patent applications Ser. Nos. 08/212,548 and 08/350,877 and entitled "Continuous Vertical Form-Fill-Seal Packaging Machine With Constant Motion Carriage" and "Continuous Vertical Form-Fill-Seal Packaging Machine With Synchronized Product Clamp", also owned by the assignee of the present invention. Such a scenario provides additional impetus to improvement in the efficiency and overall speed of the weighing system in order to reach the next level of operating efficiency and technology in the form, fill and seal packaging industry.

Thus, an important aspect of the present invention is to provide a multiple in-series hopper system and related method that improves the product batch or charge weighing and transfer of successive batches for maximizing the speed and efficiency of the packaging system.

SUMMARY OF THE INVENTION

Accordingly, it is a primary object of the present invention to provide a hopper system for handling solid, flowing product within a computerized weighing machine to enhance the efficiency of the operation.

Another object of the present invention is to provide such a system that incorporates multiple in-series hoppers including a first in line batch forming/weighing hopper to directly receive the product from a stream, a transfer hopper next in line to receive and reform the batch, and finally a holding hopper next in line, so that computerized weighing/selection may be operative to select one or both of the transfer and holding hoppers and thereby making the forming/weighing hopper available at all times for weighing, all in a multiple shift mode of operation.

A related object of the present invention is to provide an improved hopper structure including a shell for forming the batch and a pair of clam shell doors, the upper portions of which come together inside the hopper to intercept any late product in flight, and thereby extend the multiple shift mode.

An additional object of the present invention is to provide an improved manner of operating the clam shell doors of each of the hoppers through a single nautilus style cam operating directly on followers attached to the doors.

Still another object of the present invention is to provide a system that incorporates a curved transition chute directly below the holding hopper for receiving each batch of product in a manner to minimize disruption of the batch and bouncing of the product.

Another object of the present invention is to provide a system having improved batch reforming and retention characteristics, prior to the batch being discharged into the transition chute.

An objective of the related method of the present invention includes the concept of feeding the flowing product stream directly into the batch forming/weighing hopper, discharging the batch into the transfer hopper and the holding hopper in sequence, and simultaneously repeating the steps for second and third batches, to provide the multiple shift operation.

Still another object of the method of the present invention is to extend the multiple shift operation by intercepting late, in flight product in the batch forming/weighing hopper.

Another object of the invention is to provide an efficient and cost effective manner of switching from relatively small capacity hoppers to large capacity hoppers, and vice-versa.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved multiple in-series hopper system is provided for receiving a stream of solid, flowing product, forming the product into a defined batch or charge and efficiently transferring the batch into a. packaging machine, such as a form, fill and seal type machine. In the preferred embodiment, three in line hoppers are utilized to advantage; namely, a batch forming and weighing hopper to directly receive the flow of product, a transfer hopper for receiving the batch from the forming/weighing hopper and a holding hopper for receiving and reforming the batch from the transfer hopper for later discharge into the packaging machine. Within the system, a scale is provided to initially determine the weight of the product in the forming/weighing hopper and a computer senses the batch weight for assignment in sequence to the transfer and holding hoppers. The computer is operative to select one or both of the transfer/holding hoppers for discharge, which in turn results in an efficient multiple shift weighing operation. At the same time, the forming/weighing hopper remains available to receive a new charge of product from the feed conveyor and to be available for selection to thereby further extend the multiple shift mode of operation.

The preferred structure of the forming/weighing hopper comprises a shell with an opening adjacent the top for receiving the feed of product and a pair of clam shell type doors for closing the bottom of the hopper. Upper curved portions on the doors extend into the hopper and have sufficient length to come together to intercept any late product in flight in the stream from the feed conveyor. Thus, with one or more of the hoppers available for use in making combinations during the weighing process, the next, or fourth in line batch can be initially formed. Once the doors are closed so that the lower lips close the bottom of the hopper, the product caught on top of the curved portions drops to the bottom of the forming/weighing hopper in readiness-for continuation of the weighing and transfer operation.

In addition, the transfer and holding hoppers are provided with a pair of clam shell doors and each of the three pairs of doors for the hoppers are provided with a unique mechanism for opening and closing. Specifically, the doors are oscillated by a cam having a substantially nautilus profile. A pair of cam followers is mounted on each of the doors, one follower on each side of the cam for direct engagement. A rotary driver for each of the cams opens and closes the doors in proper cycle sequence. By direct cam drive to the doors, relatively expensive and hard to clean linkage and spring systems are advantageously eliminated. As for the cam drive system for the forming/weighing hopper, the cam followers are spaced from the cam except during the opening and closing sequence, thus providing freedom for the hopper to move during the weighing cycle.

The doors of the holding hopper slope at an 8°–14° angle in the direction along the closing lips of the door so that the batch is reformed in this hopper and closely nested together to minimize string out and bouncing of the product as it is discharged. The lower transition chute receiving the batch is curved in the direction toward the center of the weighing machine, starting from the lower end of the bottom of the holding hopper.

In accordance with the related computerized weighing method of the present invention designed to fill or assist in filling a package or the like, there is provided a series of steps through the in-series hoppers that provide substantial improved results and advantages. The first step is forming in a single lane the solid flowing product stream. The second step is feeding the stream directly to the batch forming/weighing hopper. After forming and weighing, the first batch is discharged into the transfer hopper and then into the holding hopper, each time reforming the product into a batch. These steps of feeding, weighing, discharging and reforming are repeated for second and third batches. The weights assigned to the hoppers are checked by computer, so that the product from one or more of the batches can be selected.

An additional important aspect of the method is intercepting the product stream of late, in flight product to initiate forming of a fourth batch, thus extending the multiple shift mode by at least a third batch and a fourth partial batch for packaging. As soon as the doors for the forming/weighing hopper are closed, the partial batch drops to the bottom of the hopper and feeding of the product continues from the feed conveyor in a stream.

In another related method of the present invention, there is provided a simple manner of converting the multiple in-series hopper system on a machine frame from relatively small to relatively large capacity. For example, when there are provided three relatively small in-series capacity hoppers that operate in the manner set forth above, a conversion can be made to two large capacity hoppers. The hoppers are supported by at least one support member at corresponding spaced locations on the frame to carry out the weighing and transfer operation as described. When a large capacity operation is desired, at least two of the small capacity hoppers are removed and replaced with at least one large capacity hopper. The third hopper can also be changed to large capacity. In doing so, a different combination of support members on the frame are engaged. Using this method, conversion from a small capacity system to a large capacity system, and vice-versa, is very economical and efficient. In addition, this method contemplates sensing the location of the support members on the frame and automatically updating the computer to adapt the weighing operation to the proper capacity mode of operation.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrates several aspects of the present invention and together with the description serves to explain the principles of the invention. In the drawings:

FIG. 1 is a side/partial cross sectional view of a single lane on a computerized weighing machine showing a representative arrangement of forming/weighing, transfer and holding hoppers inseries and showing the flow of product in one state of operation;

FIG. 2 is a similar view of the hoppers in-series but showing a different sequential state of operation from that shown in FIG. 1;

FIG. 2a is still another side/partial cross sectional view illustrating still another state of operation of the hoppers and doors, illustrating in particular the extended multiple shift plus one concept;

FIG. 3 is a front elevational view of the multiple hoppers and illustrating the operation of the clam shell style doors between the full line closed position and the dashed line open position;

FIG. 3a is a front elevational view of one section of the weighing machine frame including mounting plates exposed for clarity, and showing in cross section multiple mounting pins for engaging corresponding receiving apertures of support members on the frame, all typical for a relatively small capacity weighing arrangement;

FIG. 5 is a perspective view of the forming/weighing hopper of the present invention with the nautilus style cam exploded away from the Figure for clarity;

FIG. 5a is a partial cross sectional view along line 5a—5a in FIG. 5 illustrating the scraper for removing residual product as the upper portion of the doors are moved out of the hopper during closing;

FIG. 6 is a side view illustrating the large capacity hoppers in the practice of the conversion method of the present invention to large capacity operation;

FIG. 6a is a front elevation view similar to FIG. 3a but showing for the large capacity operation the manner of support of mounting pins in cross section engaging corresponding apertures of the support members on the machine frame;

FIG. 7 is an enlarged side view of a mounting pin for either a relatively small or relatively large capacity hopper engaging the corresponding support tube with detent on the machine frame and a sensor for providing feedback to the computer to input the small/large operating mode.

Figure 4A:
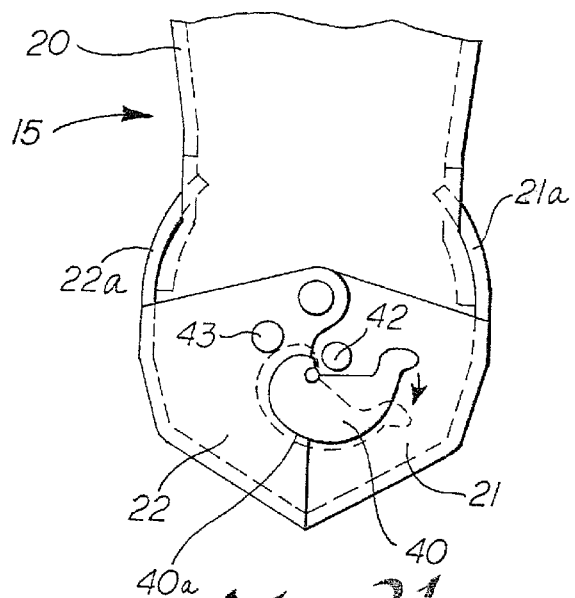
FIGS. 4a, 4b, 4c illustrate in sequence the operation of the nautilus style cam for opening the doors in the forming/weighing hopper.

Reference will now be made in detail to the present preferred embodiment of the invention, an example of which is illustrated in the accompanying drawings.

DETAILED DESCRIPTION OF THE INVENTION

Reference is now made to FIG. 1 showing an improved multiple in-series hopper system, generally designated by the reference numeral 10 and mounted on a typical computerized combinational weighing machine frame 11. As illustrated in this figure, a stream of solid, flowing product P is being fed from a typical center distributor plate 11 and into a vibrating feed conveyor 12. It is to be understood by those of skill in the art that the illustration in FIG. 1 is a single lane of a weighing machine and that a typical arrangement is for additional lanes to be situated around the periphery of-the machine with the distributor plate 11 forming the center. As is apparent from the above description and viewing FIG. 1, the overall objective is to form and transfer a batch of product P from the stream flowing from the feed conveyor 12.

A batch forming and weighing hopper 15 receives the stream of product, as noted by the reference indicia $P_1$. A scale S, which typically can be of the strain gauge type with a dampening mechanism is operative to determine the weight of the product within the batch forming/weighing hopper 15. As further illustrated in FIG. 1, a transfer hopper 16 receives the batch of product $P_2$ from the forming/weighing hopper 15 when the doors are opened, as will be described further in detail below. In turn, a holding hopper 17 holds the final batch of weighed product $P_3$, which batch is discharged onto a transition chute 18 when the gates are opened, also as will be described below.

Figure 8:
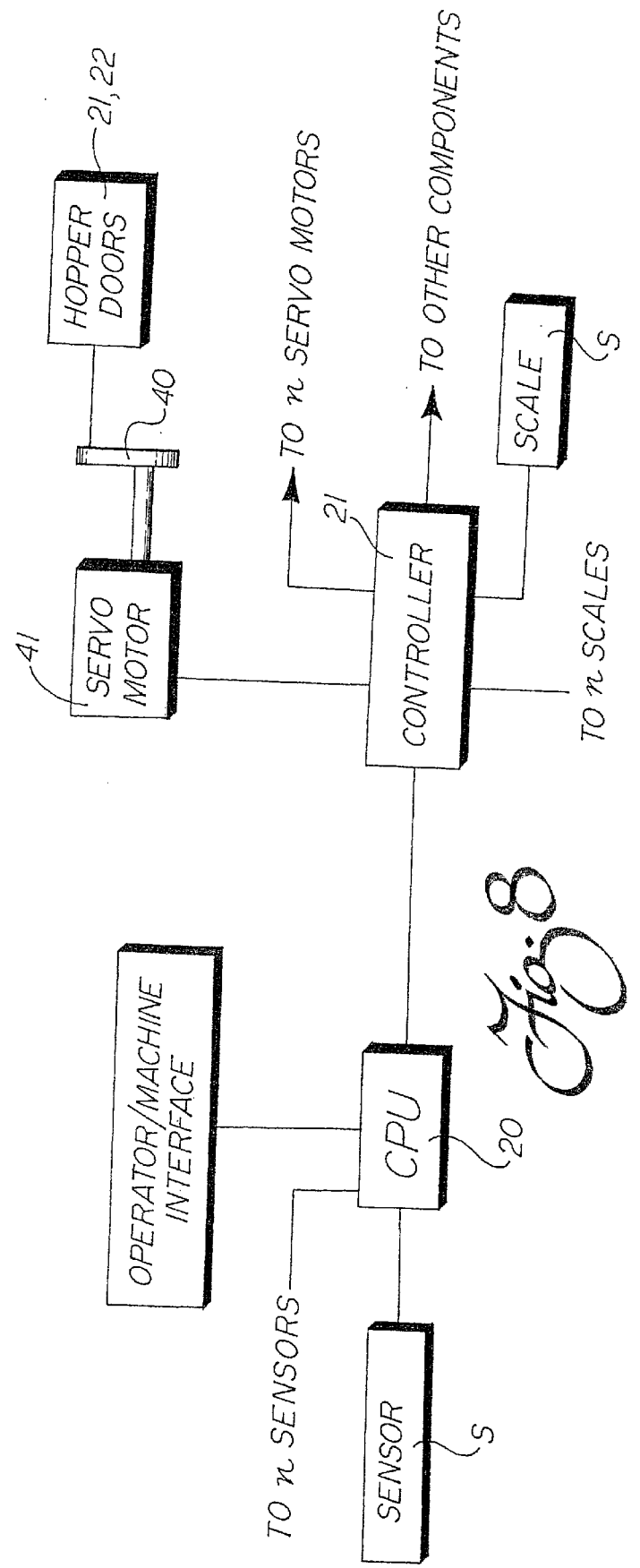
FIG. 8 is a schematic diagram illustrating the computerized control circuitry of the present invention.

With reference to FIG. 8, a computer/CPU 20 is provided for operation of the system in combination with a controller 21. The scale S of the forming/weighing lane of the weighing machine illustrated in FIG. 1, plus n scales of the other lanes (not shown) provides its signal to the controller 21. Thus, the signal from the scale S indicates the batch weight and in turn this signal is transmitted to the computer/CPU for processing and selection of one or more batches for making weight in the system. The computer 20 may select one or both of the transfer and holding hoppers 16, 17 for discharge in the basic multiple shift operation of the present invention. Advantageously, according to the present invention the forming/weighing hopper remains available for batch forming and weighing at all times during selection of one or both of the batches within the transfer/holding hoppers 16, 17, and is also selectable as an extension of said multiple shift.

Preferably, the forming/weighing hopper 15 comprises a shell 20 and a pair of opposed, clam shell type doors 21, 22 (see FIGS. 3 and 5 in particular). As is apparent, the doors 21, 22 close the bottom of the hopper which of course results in formation, and allows for weighing of the batch of product $P_1'$ on the inside (see FIG. 2).

Figure 4B:
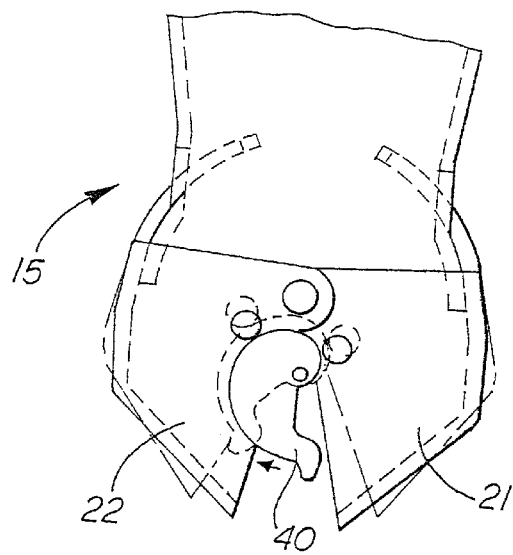
Figure 4C:
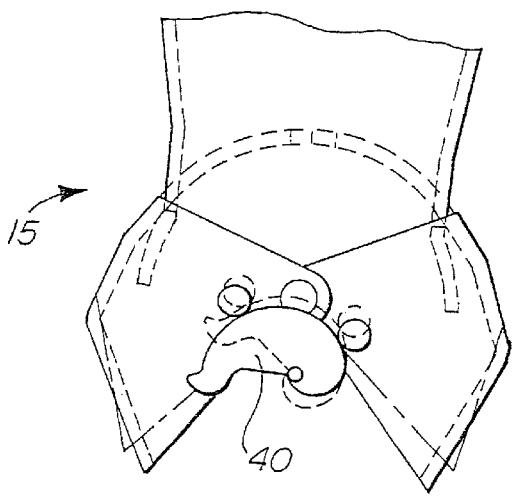

The clam shell doors 21, 22 include an upper portion 21a, 22a, respectively (see FIGS. 4 and 5). These upper portions 21a, 22a are curved and are positioned to extend from the top of the respective doors into the hopper 15. As illustrated, the portions 21, 22 have sufficient length so that the upper edges come together on the inside of the hopper when the doors are open for discharge of the product batch (see FIGS. 4a–4c). As illustrated in FIG. 1, with the doors 21, 22 open, in flight late product $P_1$ in the stream of product entering the hopper from the conveyor 12 is intercepted and thus initiates formation of a batch of product separate from the product batch $P_2$ being discharged at that time.

Thus, with reference back to FIG. 1 of the drawings, it will be realized that in one state of the operation of the system of the present invention, the in flight product $P_1$ is intercepted, a batch of product $P_2$ enters the transfer hopper 16 with the doors closed. At the same time, the computer 20 makes the selection for combining the batch of product $P_3$ with other batches (not shown) to make weight for a package.

Then, in next state of operation upon closing of the doors 21, 22, as shown in FIG. 2, the intercepted product $P_1$ drops to the bottom of the forming/weighing hopper 15 and forms a new batch $P_1'$. At the same time, the discharged batch of product $P_2$ has dropped to the bottom of the transfer conveyor 16 to form the completed weighed batch $P_2'$. Similarly, in this state of operation, the product batch $P_3'$ now fills the holding hopper 17.

With respect to the transfer hopper 16, an upper shell 30 and clam shell type doors 31, 32 are provided in a manner similar to the structure of the forming/weighing hopper 20 and related doors 21, 22. These doors include lower lips that come together and close the bottom of the transfer hopper 16 (see FIGS. 2 and 3). Similarly, the holding hopper 17 includes a shell 35 and opposed clam shell style doors 36, 37. All three sets of doors 21, 22 and 31, 32 and 36, 37 are oscillated by a rotary driver to open and close in an efficient manner as illustrated.

More particularly, the present invention contemplates the use of a single oscillating cam with the operative face 40a formed to simulate a nautilus shell; the cam being designated by the reference numeral 40 and supported on a shaft and driven in an oscillatory manner by a servo motor 41, or a similar driver such as a rotary solenoid. Advantageously, the cam 40 directly engages cam followers 42, 43 positioned on the outer skirt of the doors 21, 22. This is best shown with respect to the weighing hopper 15 in FIGS. 4a–4c. The cam 40 with the nautilus profile operating face 40a is positioned between the two followers 42, 43 and upon rotation equally and progressively moves the doors 21, 22 to the open position, as best shown in FIGS. 4a–4c. As shown in FIG. 4a, the followers 42, 43 are out of engagement with the face 40a when in the home position thereby allowing the hopper 15 to be free for weighing action (see FIG. 4a). The doors 31, 32 and 36, 37 of the hoppers 16, 17 are operated by an identical oscillating cam (shown generally, but not numbered).

As mentioned above, the curved transition chute 18 is positioned below the holding hopper 17, and as illustrated in FIG. 1, receives the batch of product $P_3$ in a very efficient manner. The entry point for the chute 18 is adjacent the lower end of the bottom of the holding hopper. In this manner, as the product $P_3$ is released, it tends to remain nested together and not string out so that the product travels primarily as a batch. This arrangement contributes to not only the speed of transition of the product $P_3$ down the chute 18, but also prevents bouncing and possible breakage of individual pieces of the product.

As illustrated in FIG. 1, and also in FIG. 2, the slope of the bottom of the hopper 17 along the closing lips of the doors 36, 37 is in the range of 8°–14° and extends toward the entry point of the transition chute 18. Advantageously, the product ready to be discharged from the hopper 17, namely product $P_3'$ (see FIG. 2), is nested and settled at the lower end of the bottom that results in the minimum string out and bouncing of the product along the chute 18. The optimum angle for assuring this function is 10° (see FIG. 2). Also, to maximize the effectiveness of the curved entry to the transition chute 18 there is an extension of between ¼ and ½ of the length of the holding hopper 17 (see dashed dot line in FIG. 1).

In order to insure that the upper portions 21a, 22a of the doors 21, 22 remain free of product build up, a suitable flexible scraper 50 is positioned in the opening along the side of the shell 20 (see FIG. 5a).

With reference back to FIG. 3, and by comparison to FIG. 3a, each of the hoppers 15, 16 and 17 are mounted on the machine frame 11 by three mounting pins. The pins are illustrated in cross section on three separate, spaced mounting plates 65, 66 and 67. As will be apparent, the weighing hopper 15 is supported by the three pins engaging the plate 65; the transfer hopper 16 is supported by the pins shown with respect to plate 66 and the holding hopper 17 is supported by the pins shown with respect to the plate 67. The pins fit into apertures in these plates and extend through support tubes, as can be seen in detail in FIG. 2.

In particular, one of the mounting pins for each of the hoppers 15, 16, 17 are shown in a representative fashion in FIG. 7. Mounting pin 70 extends through the plate 65 and into a support tube 71. The movement of the mounting pin 70 into and out of final locked position is shown by the dashed line action arrow in this figure. On the end of the mounting pin 17 is a tapered extension 72 that cooperates with resilient detent members 73, 74 to hold the pin 70 in position. In the final full line position, the end of the extension 72 is moved into proximity or in contact with a magnetic sensor S, which can be the type operating in accordance with the Hall effect or other suitable principle. The sensor S is connected to the computer 20, as illustrated in FIG. 8, in order to provide indication of the presence of that particular pin 70 of the weighing hopper 15. Of course, each of the other pins, as illustrated in FIG. 3a, is associated with the n sensors that also provide an input to the computer 20 (see FIG. 8).

In the alternative embodiment of FIG. 6, a large capacity weighing hopper 80 is provided and is supported by an array of three pins, as illustrated with respect to the mounting plate 65' in FIG. 6a. To operate the doors of the hopper 80, the same cam 41 that is operative for operation of the doors 21, 22 in the smaller capacity hopper 15 is utilized. A large capacity holding hopper 82 takes the place of the smaller capacity transfer hopper 16 and the holding hopper 17. In this instance, the plates 66', 67' receive (instead of six mounting pins for the smaller capacity hopper 16, 17) only three pins for the larger capacity holding hopper 82, as shown by cross section depiction. In this instance, since the sensors S cooperating with the pins 70 of the large capacity holding hopper 82 are in a different pattern, namely two upper pins in plate 66' and one lower pin in plate 67', then the signal to the computer 20 is different and updating to the large capacity mode is automatically entered.

With reference now to the computerized weighing method for a series of product batches for filling or assisting in filling a package or the like, the steps can be readily understood by reference to FIGS. 1, 2 and 2a of the drawings. First, with reference to a single lane, and referring specifically to FIG. 2, a solid flowing product stream $P_1'$ enters the weighing hopper 15 directly from the feed conveyor 12 through an opening in the upper part of the shell 20. Forming and eventual weighing of the batch takes place within the hopper 15 with the signal from the scale S being fed to the controller 21 for processing. Upon command, the batch of product $P_1'$ within the forming/weighing hopper 15 will be discharged into the transfer hopper 16 for reforming as represented by $P_2'$. In turn, the batch of product $P_2'$ is fed to the holding hopper 17 as $P_3'$ until selected by the computer 20 and controller 21. As the batches are discharged (see FIG. 1) the feeding, weighing, discharging and reforming steps for second and third batches of product are again carried out. The computer 20 continuously checks the product weights assigned to each of the hoppers 16, 17 and is operative at all times for combining product from one or more of the batches within these hoppers 16, 17.

In one extended operational mode as depicted in FIG. 2a, a first batch $P_1''$ is selected and discharged from the forming/weighing hopper 15; a second batch of product $P_2''$ is selected and being discharged from the transfer hopper 16 and a third batch $P_3''$ is selected and being discharged from the holding hopper 17. In this manner, the multiple shift mode is extended to supply a maximum number of weighed batches for packaging.

Furthermore with respect to the method of the present invention, at the same time batches of product are being discharged as noted in FIG. 2a, the product stream entering the forming/weighing hopper 15 is being converted into at least a partial batch of product $P_4''$, whereby is provided the same multiple shift mode plus one.

With reference again to FIG. 6 of the drawings, the method of converting the multiple or three in-series hopper system from relatively small to relatively large capacity can be visualized. First, the three relatively small capacity hoppers are provided, as set forth in FIGS. 1, 2 and 2a. At least one support pin is engaging each of the plates 65–67, as shown in FIG. 3a. According to the method of conversion, at least the two small capacity transfer and holding hoppers 16, 17 are removed and replaced with the single large capacity holding hopper 82 (see FIG. 6). In doing so, the plates as designated by 66', 67' have pins 70 located in a different combination of support tubes 71. The pattern of pins 70 thus represented in FIG. 6a is recognized by the computer 20, thereby providing direct updating to the selected hopper capacity operating mode of the system.

Advantageously, the conversion is made by moving each hopper 15–17 and 80, 82 in substantially a straight line with respect to the support tubes 71 on the machine frame 11. The tubes 71 are operative to guide the mounting pins in a substantially straight line for easy manipulation. To lock the hoppers in position, suitable detents 73, 74 for each of the support tubes are utilized, as illustrated in FIG. 7.

In summary, it will be realized that substantial results and advantages are obtained by the multiple in-series hopper system of the present invention. By providing a forming/weighing hopper 15 in combination with the transfer hopper 16 and the holding hopper 17 an improved multiple shift operation is obtained. The computer 20 is operative to select one or both of the transfer and holding hoppers 16, 17 for discharge of the batches $P_2'$ and $P_3'$, as desired (see FIG. 2). In the optimum operational mode, the multiple shift operation can be extended further to select and discharge batches of product $P_1''$, $P_2''$, $P_3''$, and at the same time initiate formation of batch of product $P_4''$, as shown in FIG. 2a. The forming/weighing hopper includes clam shell doors 21, 22 with upper portions 21a, 22a that are operative to intercept the late product in flight, so as to initiate the formation of the batch $P_4''$. In addition, the holding hopper 17 includes a sloped bottom in the direction along the closing lips of the doors 36, 37 in order to better control the discharge of each batch into the transition chute 18. Preferably, the upper portion of the transition chute 18 is curved to further enhance the controlled flow of the product. Finally, the system can be converted from a relatively small capacity to a relatively large capacity by removing the transfer and holding hoppers 16, 17 and replacing these with a single high capacity holding hopper 82. In doing so, the computer 20 receives signals for direct updating of the selected hopper capacity. Furthermore, the conversion is simplified by straight line movement of the hoppers due to the mounting pin 70 and the support tube 71 combination.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. A hopper assembly for receiving solid, flowing product to form and transfer as a controlled batch, comprising:

a shell for forming the batch received through an opening adjacent the top;

a pair of clam shell doors having opposed lower lips closing the bottom of said shell;

means for oscillating said doors for opening to discharge the batch and for closing to form the next batch in said shell; and a curved transition chute positioned below said shell to receive the batch;

said chute gradually curving away from a vertical slope downwardly from adjacent one end of said shell and extending under said shell for delivery of each batch to a position spaced inwardly with respect to said shell, whereby said batch being received from said shell is controlled to minimize string out and bouncing of the product along said chute.

2. The hopper system of claim 1 wherein is further provided a batch forming hopper to receive the product of said stream and form said batch;

a transfer hopper for receiving said batch from said forming hopper for later discharge;

a scale to determine the weight of product in said batch;

said holding hopper for receiving said batch from said transfer hopper for later discharge;

a computer for sensing said batch weight from said scale and assigning in sequence the weight to said transfer and said holding hoppers;

said computer being operative to select at least one of said transfer and holding hoppers for discharge;

at least said holding hopper comprises a shell for forming the batch received through an opening adjacent the top;

a pair of clam shell doors having opposed lower lips closing the bottom of the shell; and means for oscillating said doors for opening to discharge the batch and for closing to form the next batch.

3. The hopper assembly of claim 1 wherein said transition chute is curved from ¼ to ½ along the length of said shell.

4. The hopper assembly of claim 3 wherein said doors slope between substantially 8°–14° in the direction along the closing lips of said doors and toward the entry point of said chute.

5. The hopper assembly of claim 4 wherein said doors slopes at an angle of 10°.

6. The hopper assembly of claim 1 wherein said shell slopes between substantially 8°–14° in the direction along the closing lips of said doors and toward the entry point of said chute.

7. The hopper assembly of claim 1 wherein said doors have an upper curved portion with opposed upper edges extending from the top of each door into said shell;

said upper portions having sufficient length to come substantially together inside said shell when said doors are open, whereby said doors intercept any late product in flight in said stream when said doors are open to discharge the batch and to initiate formation of the next batch.

8. The hopper assembly of claim 7 wherein said doors slope between substantially 8°–14° in the direction along the closing lips of said doors.

9. The hopper assembly of claim 7 wherein said transition chute is curved from ¼ to ½ along the length of said shell.

10. The hopper assembly of claim 9 wherein said doors slope between substantially 8°–14° in the direction along the closing lips of said doors and toward the entry point of said chute.

11. The hopper assembly of claim 10 wherein said doors slope at an angle of 10°.

12. A hopper assembly for receiving solid, flowing product to form and transfer as a controlled batch, comprising:

at least one hopper for holding said batch;

a curved transition chute positioned below said holding hopper to receive the batch;

said chute gradually curving away from a vertical slope downwardly from adjacent one end of said holding hopper and extending under said holding hopper for delivery of each batch to a position spaced inwardly with respect to said holding hopper, whereby the batch being received from said holding hopper is controlled to minimize string out and bouncing of the product along said chute.

13. The hopper system of claim 2 wherein said holding hopper slopes between substantially 8°–14° in the direction along the closing lips of said doors and toward the entry point of said chute;

said transition chute being curved from ¼ to ½ along the length of said holding hopper;

whereby the batch is formed at one end for improved nesting and subsequent controlled discharge to minimize string out and bouncing of the product along the chute.

14. The hopper system of claim 12 wherein said transition chute is curved from ¼ to ½ along the length of said holding hopper.

15. The hopper system of claim 13 wherein said holding hopper slopes at an angle of 10°.

16. The hopper system of claim 2 wherein said clam shell doors further have an upper curved portion with opposed upper edges extending from the top of each door into said hopper;

said upper portions having sufficient length to come together inside said hopper when said doors are open, whereby said doors intercept any late product in flight in said stream when said doors are open to discharge the batch and to initiate formation of the next batch.

17. The hopper system of claim 16 wherein said holding hopper slopes between substantially 8°–14° in the direction along the closing lips of said doors and toward the entry point of said chute;

said transition chute being curved from ¼ to ½ along the length of said holding hopper, whereby the batch being received from said holding hopper is controlled to minimize string out and bouncing of the product along the chute.

18. The hopper system of claim 17 wherein said holding hopper slopes at an angle of 10°.

19. A multiple in-series hopper system for receiving a stream of solid, flowing product to form and transfer as a batch, comprising:

a batch forming and weighing hopper to directly receive the product of said stream and form said batch for later discharge;

a scale to determine the weight of product in said batch in said weighing hopper;

a transfer hopper for receiving said batch from said forming/weighing hopper for later discharge;

a holding hopper for receiving said batch from said transfer hopper for later discharge;

a computer for sensing said batch weight from said scale and assigning the weight;

said computer being operative to select at least said holding hopper for discharge;

whereby said forming/weighing hopper is available for batch forming and weighing at all times during selection of at least said holding hopper.

* * * * *